United States Patent

Smernoff

[15] 3,645,688
[45] Feb. 29, 1972

[54] MEASURING TRIGLYCERIDE AND CHOLESTEROL IN BLOOD PLASMA OR SERUM

[72] Inventor: Ronald B. Smernoff, Belmont, Calif.
[73] Assignee: Oxford Laboratories, San Mateo, Calif.
[22] Filed: Mar. 25, 1970
[21] Appl. No.: 22,548

[52] U.S. Cl. ................................................. 23/230 B
[51] Int. Cl. ........................................... G01n 33/16
[58] Field of Search ................................. 23/230 B

[56] References Cited

OTHER PUBLICATIONS

Narayan et al., Chem. Abstr. 52, 3889e (1958).

*Primary Examiner*—Morris O. Wolk
*Assistant Examiner*—R. M. Reese
*Attorney*—Limbach, Limbach & Sutton

[57] ABSTRACT

Method of detecting and analyzing hyperlipoproteinemia. Interfering components of blood or plasma are extracted with an alumina mixture and values of cholesterol and triglyceride in the extract are determined, so that the type and presence of hyperlipoproteinemia may be recognized.

10 Claims, 1 Drawing Figure

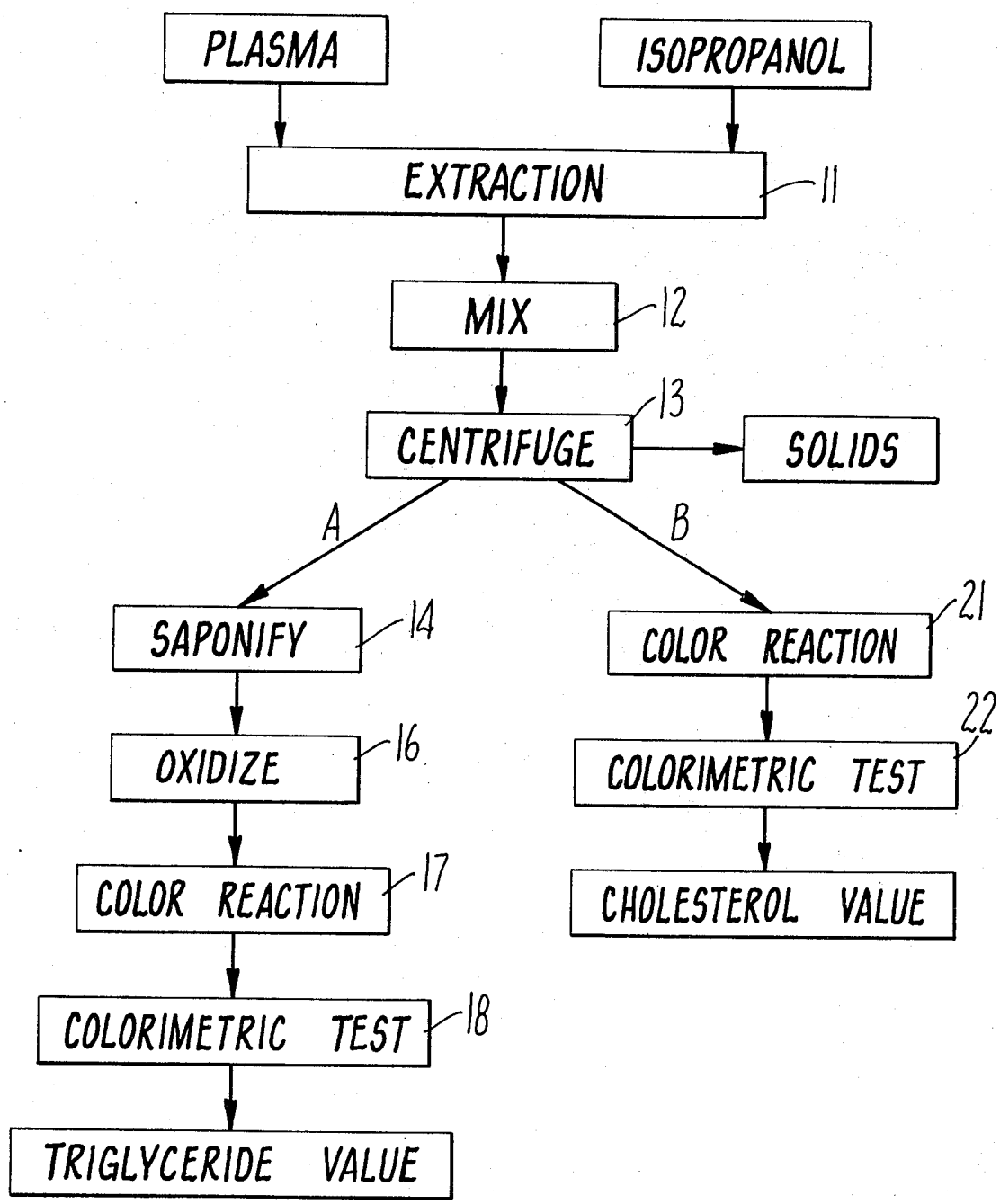

MEASURING TRIGLYCERIDE AND CHOLESTEROL IN BLOOD PLASMA OR SERUM

BACKGROUND OF THE INVENTION

This invention relates to detecting disorders in lipid metabolism. More particularly, the invention relates to colorimetric determination of the levels of triglyceride and cholesterol for determining presence and type of hyperlipoproteinemia.

Cardiovascular disease is the primary cause of mortality in the Western civilization. Atherosclerosis and related coronary heart disease contribute about 60 percent of the mortality of cardiovascular diseases. Stated another way, atherosclerosis and coronary heart disease are responsible for about 240,000 deaths annually in the United States alone.

In view of the severity and extent of the problem, it is essential to predict and prevent atherosclerosis and coronary heart disease by screening large numbers of people. It is known that disorders in lipid metabolism and carbohydrate metabolism are the major associative preconditions in the genesis of atherosclerosis and coronary heart disease. It has been determined that elevated levels of cholesterol or triglycerides are frequently associated with atherosclerosis. It is believed that these disorders are principally of genetic origin and that the initial disorders are manifestations and phenotypes of inborn errors in lipid transport. The different types of disorders have been analyzed as hyperlipoproteinemia by Frederickson, et al. in N. Eng. J. Med. Vol. 276 (1967).

The different types of hyperlipoproteinemia may conveniently be determined from analysis of cholesterol and triglyceride levels used in the nomogram of Harlan, Arch. Intern. Med. Vol. 124 (July 1969). In order to preliminarily screen large populations for hyperlipoproteinemia, it is then necessary to simply measure plasma triglyceride and plasma cholesterol levels along with visual specimen inspection for each individual. Individuals who exhibit elevation of either cholesterol or triglyceride levels may then be tested further. There is, therefore, a need for a rapid, inexpensive, reliable method of detecting hyperlipoproteinemia.

SUMMARY OF INVENTION AND OBJECTS

The present invention relates to a method of detecting hyperlipoproteinemia by mixing serum or plasma with a lipid solvent and an alumina absorbent to remove interfering components. The dissolved lipids are separated and tested for elevated values of triglyceride and cholesterol.

It is an object of the present invention to predict atherosclerosis and coronary heart disease by detection and classification of hyperlipoproteinemia.

It is a further object of the invention to provide an improved method of determining cholesterol and triglyceride levels simultaneously with a minimum of measurements and dilutions, using readily available equipment and no unstable reagents or difficult steps.

BRIEF DESCRIPTION OF THE DRAWING

The figure is a flowsheet illustrating the steps to be carried out in the method of the present invention.

DESCRIPTION OF THE PREFERRED EMBODIMENT

Referring to the figure, the method has as its preferred embodiment a simultaneous determination of cholesterol and triglyceride values. In step 16 plasma and isopropanol are introduced into an extraction tube. The extraction tube may conveniently be prefilled with extraction mixture, sealed and kept ready for use in a clinical laboratory. I have found a glass extraction tube 16×100 mm. containing 2 grams of extraction mixture to be highly satisfactory.

The method of the present invention may be practiced on any substance containing triglyceride and/or cholesterol. The drawing illustrates plasma as the source material, but serum may also be provided as the starting material with equal results, since interferring blood components are separated from the neutral lipids according to the present process. Moreover, tissue or biological specimens may be the starting material from which cholesterol and/or triglyceride values are determined. Fasting-state plasma or serum is preferred. The sequence of introducing the alcohol and source material into the extraction tube is not significant.

The isopropyl alcohol serves to coagulate proteins for absorption on the extraction mixture and to dissolve lipids to be separated. While isopropyl alcohol is the agent of choice, other solvents for triglyceride and cholesterol may be used, such as chloroform, but they have not proved to be as effective as isopropyl alcohol for dissolving both the cholesterol and triglyceride.

The extraction step is carried out with a mixture of absorbents. An important aspect of the present invention is the use of alumina in major proportion as the absorbent. In the past, extraction has been carried out using zeolite for the purpose of removing interfering components of the plasma or serum. Unfortunately, zeolites are not stable and must be reactivated periodically to perform satisfactory absorbing functions. Zeolites tend to lose activation in a matter of days, whereas activated alumina used in the present process holds its activation for at least a year.

The alumina used as the absorbent may be of any convenient particle size for absorption. Particle sizes within the range of 50 to 400 mesh are satisfactory. A preferred alumina is Alcoa F-1, 48-100 mesh.

The absorbent mixture also contains diatomaceous earth for the purpose of removing bilirubin to the extent it is not removed by the alumina. Alumina separates phospolipids and monoglycerides and diglycerides from the triglyceride components of the plasma or serum. Clean and complete separation of triglyceride is essential for accurate determination and analysis. Alumina has a distinct advantage in this respect over the zeolites formerly used in that it sediments out better than zeolites, which have a fluffy nature.

The extraction mixture may also contain additional ingredients for specific purposes, so long as the major proportion is alumina. Thus, to prevent glucose interference, it is preferred to add a small amount of copper sulfate and lime. Copper oxidizes the glucose in alkaline medium provided by the presence of lime. It is also preferred to add a small amount of activated zeolite to absorb any undesired blood component not absorbed to alumina.

Ordinarily, none of the added ingredients need make up more than 2 percent of the total extraction mixture. In any event, the alumina must be the major component. At least 90 percent alumina is preferred, with the following composition having been found to be highly satisfactory:

| | |
|---|---|
| Alumina | 1000.0 grams |
| Anhydrous lime | 20.0 grams |
| Diatomaceous earth | 20.0 grams |
| Anhydrous CuSO$_4$ | 0.5 grams |
| Activated zeolite | 0.5 grams |
| | 1047.0 grams |

Separation of coagulated blood components absorbed on the alumina is facilitated by vigorous mixing in step 12. Thorough contact with isopropyl alcohol, plasma or serum and extraction mixture is essential for a complete separation of triglyceride and cholesterol from other components. While mixing may be accomplished manually or with other conventional mixing equipment, I prefer to use a Vortex mixer for consistent results. Mixing in step 12 is preferably accomplished by placing the plugged extraction tube containing plasma or serum and isopropyl alcohol on a Vortex mixer for 5 to 10 seconds.

After complete absorption of the undesired components on the extraction mixture, the tube is centrifuged in step 13. The solids may then be discarded and the liquid used for determining triglyceride and cholesterol. The triglyceride determination follows the path A of the flowsheet. As is conventional in colorimetric determination, it is preferred to use a comparison between Blank, Standard, and Unknown samples. The Standard is a known concentration of a triglyceride in isopropanol. The preferred standard triglyceride is triolein and a Standard curve is plotted with optical density versus concentration at appropriate values, such as 0, 100, 200 and 300 mg. percent. In the preferred technique, a 16×100 or 16×125 mm. disposable glass culture tube is used, 1.0 ml. isopropyl alcohol is added to a tube designated Blank, 1.0 ml. of diluted standard is added to the tube designated Standard and 1.0 ml. of Lipid Extract is added to each tube designated Unknown.

In step 14 the triglyceride in the lipid extract is saponified to glycerol. Saponification is conveniently accomplished using concentrated potassium hydroxide. It is preferred to use 6.25 N potassium hydroxide introduced by a dropper bottle. Only one drop is necessary at this concentration for saponification of triglyceride in 1.0 ml. of lipid extract. Saponification is completed by incubating the lipid extract with potassium hydroxide solution after plugging and mixing the tubes. Incubation is conveniently accomplished in a water bath set at 60° to 70° C. Ordinarily, incubation for 5 minutes is satisfactory.

Following the incubation period, the tubes are removed from the water bath and the saponified glycerol is oxidized in step 16. Any convenient mild oxidizing agent may be used, but it is preferred to employ sodium metaperiodate. With the sample sizes indicated, 0.6 percent sodium metaperiodate in dilute acetic acid is highly satisfactory as the oxidizing agent. 1.0 ml. of the oxidizing agent is added to the tubes removed from the water bath.

In step 17 a color reaction takes place so that the triglyceride value may be colorimetrically determined. The reaction product of the oxidation step 16 is formaldehyde which is reacted with a beta diketone in step 17 according to the method of Fletcher, Clin. Chim, Acta 22 (1968). The preferred beta diketone is acetylacetone. With acetylacetone, the triglyceride derivative reacts to form a yellow dihydrolutidine derative absorbing at 405 m$\mu$. Step 17 is conveniently carried out using acetylacetone working solution which is prepared by adding 0.75 ml. of acetylacetone in 100 ml. of alcoholic ammonia, consisting of ammonia buffer with isopropanol at pH 6.0. 0.5 ml. of working acetylacetone solution is added to each sample and mixed in step 17. The samples are then replugged and incubated for 5 minutes in the water bath at 60° to 70° C.

In step 18 the colorimetric testing is accomplished using a spectrophotometer. The optical density of the incubated solution is measured at 405 m$\mu$ against the reagent Blank. Standard points should be established for the spectrophotometer at 75, 150 and 300 mg. percent triglyceride. The determination of optical density of the unknown thus provides the triglyceride value estimation.

Turning to the path marked B on the flowsheet, cholesterol is determined by adding a color-forming reagent in step 21 to the lipid extract. As with the triglyceride determination, cholesterol determination is conveniently accomplished with disposable glass culture tube marked Blank, Standard and Unknown. 1.0 ml. of isopropyl alcohol is added to the Blank and 1.0 ml. of diluted Standard is added to each of the tubes designated Standard. 1.0 ml. of lipid extract from step 13 is added to the unknown tube. 3.0 ml. color-forming reagent is added in step 21. The color-forming reagent is ferric ion. Any convenient source of ferric ion may be used, such as ferric chloride ($FeCl_3 \cdot 6H_2O$) in acetic acid. The ferric ion reacts with cholesterol in the presence of acetic acid to give a violet reaction product with sulfuric acid as catalyst. The violet color may be measured colorimetrically. The reaction with ferric ion may conveniently take place in the same incubation water bath used in the triglyceride test.

After addition of the color-forming reagent, the tubes are plugged and mixed, preferably on a Vortex mixer. Then the tubes are inserted in the water bath, maintained at 65° C. (±5° C.), and incubated for 5 minutes. The tubes are then removed and allowed to cool to room temperature when the optical density is measured at 560 m$\mu$ against the reagent Blank. A standard curve is prepared as with the triglyceride determination and the unknown values are determined from it.

The simultaneous test for both triglyceride and cholesterol after complete extraction of all interfering components provides a rapid, accurate measure of values readily used to find presence and type of hyperlipoproteinemia. Only two sample measures and three reagent pipettings, using equipment widely available, makes a simple, low-cost analysis having excellent correlation with standard tests previously used.

I claim:

1. In a method of detecting hyperlipoproteinemia, the steps of
   1. mixing serum or plasma with a lipid solvent and an absorbent comprising alumina,
   2. separating neutral lipids from remaining blood components, and
   3. performing colorimetric tests on the extracted lipids for cholesterol and triglyceride, whereby the values of cholesterol and triglyceride may be employed to detect the presence and determine the type of hyperlipoproteinemia.

2. In a method of detecting hyperlipoproteinemia, the steps of
   1. mixing serum or plasma with lipid solvent and an absorbent comprising alumina,
   2. separating neutral lipids from remaining blood components, and
   3. performing colorimetric tests on the extracted lipids for triglyceride, whereby the value of triglyceride may be employed to detect the presence and determine the type of hyperlipoproteinemia.

3. In a method of detecting hyperlipoproteinemia, the steps of
   1. mixing serum or plasma with a lipid solvent and an absorbent comprising alumina,
   2. separating neutral lipids from remaining blood components, and
   3. performing colorimetric tests on the extracted lipids for cholesterol, whereby the value of cholesterol may be employed to detect the presence and determine the type of hyperlipoproteinemia.

4. A method as in claim 2 wherein the colorimetric test for triglyceride comprises saponifying triglyceride to glycerol, oxidizing the glycerol to formaldehyde, reacting the formaldehyde with beta-diketone and colorimetrically measuring the reaction product for triglyceride value.

5. A method as in claim 3 wherein the colorimetric test for cholesterol comprises reacting cholesterol with ferric ion, incubating and colorimetrically measuring cholesterol value.

6. A method as in claim 1 wherein the absorbent comprises alumina in major proportion, and minor proportions of diatomaceous earth, copper sulfate, lime and zeolite.

7. A method as in claim 1 wherein said alumina comprises at least 90 percent of said absorbent.

8. In a method of colorimetrically determining triglyceride in serum or plasma in which dissolved neutral glycerides are extracted from serum or plasma, saponified to glycerol, oxidized to formaldehyde, and reacted to form a yellow reaction product, the improvement comprising separating dissolved glycerides by mixing with an absorbent comprising alumina.

9. In a method as in claim 8 wherein said absorbent comprises alumina in major proportion, and minor proportion of diatomaceous earth, copper sulfate, lime and activated zeolite.

10. A method as in claim 8 wherein said absorbent comprises alumina in an amount greater than 90 percent of said absorbent.

* * * * *